May 10, 1927.
J. B. SMITH
EARTH WORKING IMPLEMENT
Filed Sept. 28, 1926
1,628,562
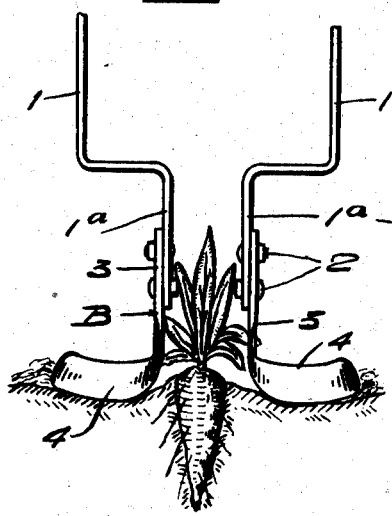
Fig. 1
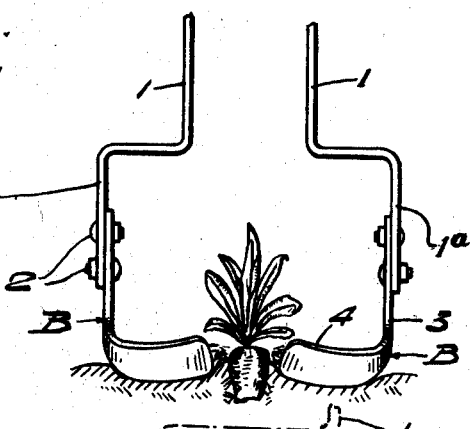
Fig. 2.
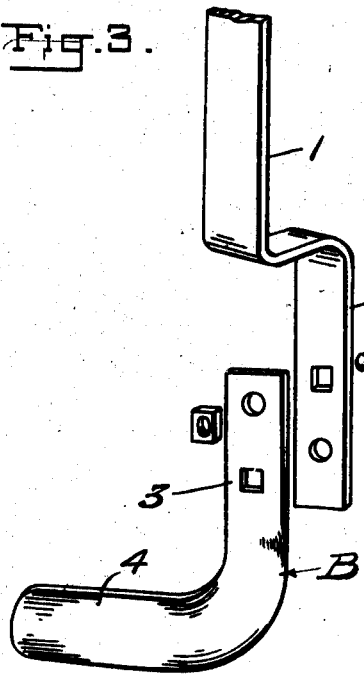
Fig. 3.
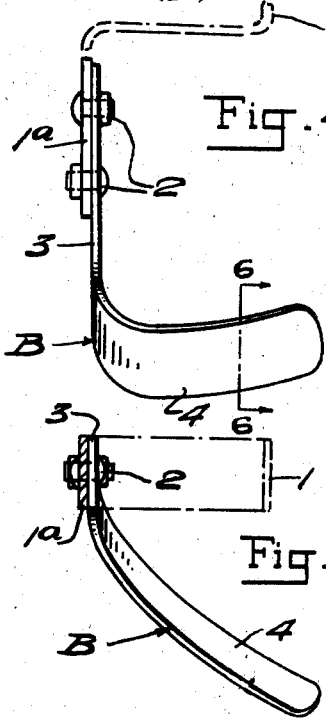
Fig. 4.
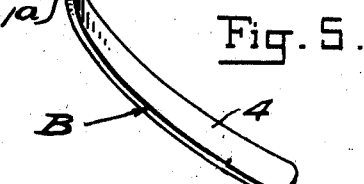
Fig. 5.
Fig. 6.
Inventor
John B. Smith Patented May 10, 1927.

1,628,562

UNITED STATES PATENT OFFICE.

JOHN B. SMITH, OF MOUNTAIN HOME, ARKANSAS, ASSIGNOR OF ONE-HALF TO BEN F. LOVE, OF MOUNTAIN HOME, ARKANSAS.

EARTH-WORKING IMPLEMENT.

Application filed September 28, 1926. Serial No. 138,308.

This invention relates to certain improvements in earth working implements and it is an object of the invention to provide a device of this kind adapted for use in connection with a cultivator or the like to effectively work the soil at opposite sides of a plant row in a manner when in one position, to free the same from weeds and the like and to throw said weeds away from the plant row but at the same time serving to pulverize the soil and which, when in a second or reverse position, operates to hill up the plants.

It is also an object of the invention to provide a device or element of this kind which will operate or work with efficiency in rocky and grubby land and which can be applied in working position with convenience and facility.

Furthermore, the invention has for an object to provide an element or device of this kind comprising a suitably curved blade having a flat face substantially vertically disposed with its lower margin formed into a cutting edge lowering into the ground at substantially right angles thereto whereby the element or device operates effectively to pulverize the soil and to throw such soil to one side in accordance with the mounting of the element or device.

The invention consists in the details of construction and in the combination and arrangement of the several parts of my improved earth working implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is an elevational view illustrating an earth working implement constructed in accordance with an embodiment of my invention and in position for use as a scraper;

Figure 2 is a view similar to Figure 1 but showing the blades in position for hilling;

Figure 3 is a view in perspective with the parts separated of an earth working implement constructed in accordance with an embodiment of my invention;

Figure 4 is a view in side elevation of the structure as illustrated in Figure 1 with a portion indicated by broken lines;

Figure 5 is a view partly in section and partly in top plan of the element as herein embodied;

Figure 6 is a sectional view taken substantially on the line 6—6 of Figure 4.

As disclosed in the accompanying drawing, 1 denotes a bar adapted to be attached to a beam of a cultivator in lieu of the conventional foot piece, the lower portion $1^a$ of which being offset. The portion $1^a$ is adapted to have detachably connected with the free extremity thereof by the bolts 2 or the like the upper end portion of a broad cutting blade B. This blade B comprises a vertical portion 3 and a lower horizontal portion 4, said portion 4 being disposed on a predetermined curvature lengthwise thereof. The lower margin of the portion 4 and the lower part of the margin of the portion 3 of the blade B are formed into a continuous knife edge so that the blade B will have requisite engagement with the soil. It is to be noted, as particularly illustrated in Figure 1, that the flat faces of the lower portion 4 of the blade B are disposed on an angle of substantially forty-five degrees with respect to the horizontal and that the forward margin of the portion 3 and the lower margin of the portion 4 of the blade B at their junction are disposed on a curvature of approximately one-quarter of a circle as illustrated in Figure 3.

It is to be noted that the blade B engages the soil in substantially a vertical position and that the curvature of the portion 4 of the blade is such to throw and scrape the soil and the like to one side. The blade B also operates effectively to pulverize the soil.

In practice, my improved blades are adapted to be mounted at opposite sides of a plant row and with the lower portion $1^a$ of each of the bars 1 disposed inwardly toward the plant row and with the portion 4 of each of the blades B extending away from such row, all weeds and grass along the plant row will be scraped away from the plant row leaving only small spaces between adjacent plants of the row to be hoed by hand. By having the offset portions $1^a$ provided in the bars 1 provision is made to cause the blades B to closely approach the plants of a row below the foliage thereof.

With the portions 1ª of the bars 1 disposed outwardly and the portions 4 of the blades arranged inwardly with respect to a plant row, the soil loosened and pulverized by the blades B will be thrown toward the plant row and thereby effectively hilling up the plants.

While I have herein specified my improved earth working implement for use in connection with a beam of a cultivator, it will be understood that it can also be used in connection with a plow or kindred implement as the requirements of practice may prefer.

From the foregoing description it is thought to be obvious that a earth working implement constructed in accordance with my invention is particularly well adapted for use by reason of the convenience and facility with which it may be assembled and operated, and it will also be obvious that my invention is susceptible of some changes and modifications without departing from the principles and spirit thereof and for this reason I do not wish to be understood as limiting myself to the precise arrangement and formation of the several parts herein shown in carrying out my invention in practice except as hereinafter claimed.

I claim:—

A ground working implement comprising, in combination, a bar adapted to be supported in a vertical position, and a blade engageable with the lower portion of the bar, said blade comprising a vertical portion and a lower horizontal portion, said horizontal portion being disposed lengthwise on a predetermined curvature, the side faces of the lower portion of the blade being disposed on an angle of approximately forty-five degrees with respect to the horizontal, the lower part of the forward margin of the vertical portion and the lower margin of the horizontally disposed portion of the blade being formed into a continuous knife edge, said margins of the vertical portion and horizontal portion at their junction being disposed on a curvature of approximately one-quarter of a circle.

In testimony whereof I hereunto affix my signature.

JOHN B. SMITH.